(12) United States Patent
Dziubinschi et al.

(10) Patent No.: US 11,493,283 B2
(45) Date of Patent: Nov. 8, 2022

(54) B-TUBE REFORM FOR IMPROVED THERMAL CYCLE PERFORMANCE

(71) Applicant: Hanon Systems, Daejeon (KR)

(72) Inventors: Orest Alexandru Dziubinschi, Dearborn, MI (US); Kastriot Shaska, Northville, MI (US); David Carl Letteer, Brighton, MI (US)

(73) Assignee: HANON SYSTEMS, Daejeon (KR)

( * ) Notice: Subject to any disclaimer, the term of this patent is extended or adjusted under 35 U.S.C. 154(b) by 495 days.

(21) Appl. No.: 16/683,322

(22) Filed: Nov. 14, 2019

(65) Prior Publication Data

US 2020/0080794 A1 Mar. 12, 2020

Related U.S. Application Data

(62) Division of application No. 15/697,754, filed on Sep. 7, 2017, now Pat. No. 10,508,870.

(60) Provisional application No. 62/408,570, filed on Oct. 14, 2016.

(51) Int. Cl.
| | |
|---|---|
| *F28F 9/02* | (2006.01) |
| *F28F 1/08* | (2006.01) |
| *F28D 1/053* | (2006.01) |
| *F28D 1/03* | (2006.01) |
| *B23P 15/26* | (2006.01) |
| *B21D 53/06* | (2006.01) |
| *B21D 53/02* | (2006.01) |

(Continued)

(52) U.S. Cl.
CPC ............. *F28F 1/08* (2013.01); *B21D 53/02* (2013.01); *B21D 53/06* (2013.01); *B23P 15/26* (2013.01); *F28D 1/0391* (2013.01); *F28D 1/0471* (2013.01); *F28D 1/05366* (2013.01); *F28D 1/05383* (2013.01); *F28F 1/022* (2013.01); *F28F 9/02* (2013.01); *F28F 2225/04* (2013.01)

(58) Field of Classification Search
CPC .................................................... F28D 1/0391
See application file for complete search history.

(56) References Cited

U.S. PATENT DOCUMENTS

| | | | |
|---|---|---|---|
| 5,579,837 A | 12/1996 | Yu et al. | |
| 5,762,133 A * | 6/1998 | Dion ................. | F28D 1/035 165/173 |
| 5,934,365 A | 8/1999 | Rhodes et al. | |

(Continued)

FOREIGN PATENT DOCUMENTS

| | | |
|---|---|---|
| DE | 19820937 A1 | 11/1999 |
| DE | 102008007597 A1 | 8/2009 |

(Continued)

*Primary Examiner* — Jacob J Cigna
(74) *Attorney, Agent, or Firm* — Shumaker, Loop & Kendrick, LLP; James D. Miller

(57) ABSTRACT

A tube for use in a heat exchanger includes an upper portion, a base portion spaced from the upper portion, and a partitioning wall depending from the upper portion. The partitioning wall is bent away and spaced from the base portion in a first section of the tube to form a single flow channel within the tube along the first section. The partitioning wall contacts the base portion in a second section of the tube to form a partition separating a first flow channel from a second flow channel along the second section. The first section of the tube is configured for reception into an opening of a header tank of the heat exchanger.

19 Claims, 5 Drawing Sheets

(51) Int. Cl.
*F28F 1/02* (2006.01)
*F28D 1/047* (2006.01)

(56) References Cited

U.S. PATENT DOCUMENTS

| | | | |
|---|---|---|---|
| 5,979,051 A * | 11/1999 | Kato | B21C 37/28 |
| | | | 165/174 |
| 6,073,688 A | 6/2000 | Kato | |
| 6,325,141 B2 * | 12/2001 | Yamauchi | F28D 1/0391 |
| | | | 165/177 |
| 6,622,785 B2 * | 9/2003 | Haegele | F28D 1/0391 |
| | | | 165/177 |
| 9,453,599 B2 | 9/2016 | Young et al. | |
| 10,145,623 B2 | 12/2018 | Contet et al. | |
| 2004/0182559 A1 | 9/2004 | Kent et al. | |
| 2014/0190675 A1 | 7/2014 | Denoual et al. | |
| 2014/0196877 A1 | 7/2014 | Wilkins et al. | |
| 2017/0045305 A1 | 2/2017 | Contet et al. | |

FOREIGN PATENT DOCUMENTS

| | | |
|---|---|---|
| DE | 102008007612 A1 | 8/2009 |
| FR | 2735221 A1 | 12/1996 |
| FR | 2832788 A1 | 5/2003 |
| JP | H03230834 A | 10/1991 |
| JP | H1194482 A | 4/1999 |
| JP | 2007298201 A | 11/2007 |
| JP | 2008128600 A | 6/2008 |

* cited by examiner

B-TUBE REFORM FOR IMPROVED THERMAL CYCLE PERFORMANCE

CROSS-REFERENCE TO RELATED APPLICATION

This patent application is a divisional patent application of U.S. patent application Ser. No. 15/697,754 filed Sep. 7, 2017, which claims priority to U.S. Provisional Patent Application Ser. No. 62/408,570, filed Oct. 14, 2016, the entire disclosure of which is hereby incorporated herein by reference.

FIELD OF THE INVENTION

The invention relates to a heat exchanger, and more specifically, to a heat exchanger including a B-shaped flat tube having a reformed tube end for attachment to a header tank of the heat exchanger.

BACKGROUND OF THE INVENTION

Heat exchangers having folded flat tubes are well known in the art. Such heat exchangers typically include a plurality of the folded flat tubes spaced apart and arranged in parallel and extending between an inlet header tank and an outlet header tank. The inlet header tank receives a first fluid and distributes the first fluid between a plurality of flow pathways formed within the flat tubes. The first fluid exchanges heat energy with a second fluid flowing through the spaces between adjacent ones of the flat tubes. After exchanging the heat energy within the flat tubes, the first fluid is recombined within the outlet header tank before exiting the heat exchanger.

One common construction of a flat tube includes folding a sheet of aluminum into a tubular structure wherein two opposing edges of the sheet are brought together and then brazed or welded at the resulting seam to form a substantially B-shaped flat tube. The central seam of the B-shaped flat tube is typically further reinforced by adding at least one fold to the opposing edges of the sheet. The folded over portions of the sheet of aluminum are positioned to abut an inner surface of the flat tube along a length thereof to form a longitudinally extending partition, wherein the partition divides a hollow interior of each of the flat tubes into two flow separate paths while also structurally reinforcing the flat tube along the central seam of the tube. This type of flat tube construction is disclosed in U.S. Pat. No. 5,579,837 to Yu et al., which is hereby incorporated by reference in its entirety.

One potential issue faced by the traditional B-shaped flat tube construction occurs as a result of the effects of thermal cycling. The repeated presence of varying characteristics within different portions of each of the tubes, such as varying temperatures experienced in different regions of each of the tubes, may lead to the formation of a bending moment within each of the tubes, such as between two adjacent flow channels formed within each of the tubes. The formation of such bending moments may affect the durability of such tubes when exposed to extended periods of thermal cycling, including varying temperatures experienced between the two flow channels of each of the tubes.

The B-shaped folded flat tube construction has been found to be particularly susceptible to thermal cycling failure at an intersection of each of the tubes and each of the header tanks. Each of the tubes is inserted into an opening formed in each of the header tanks, the opening having a cross-sectional shape substantially similar to that of an outer surface of each of the tubes, thereby restricting outward deformation of the outer surface of each of the tubes. Concurrently, the central partition adds rigidity to the interior of each of the tubes further restricting relative movement between the opposing surfaces of each of the tubes adjacent the central partition. The added rigidity adjacent the intersection of each of the tube ends and each of the header tanks exacerbates the incidence of failure due to thermal cycling because the different portions of the tubes experiencing different degrees of thermal expansion are restricted from moving and deforming relative to each other during use of the heat exchanger. The restricted motion may in some circumstances lead to elevated stresses within portions of each of the tubes that can lead to permanent deformation or eventual failure adjacent each of the header tanks.

It would therefore be desirable to produce a tube for use in a heat exchanger having multiple flow channels while also preventing the incidence of failure at an intersection of the tube and an opening in a header tank configured to receive an end of the tube.

SUMMARY OF THE INVENTION

Compatible and attuned with the present invention, a tube having a modified reinforcing structure for preventing the incidence of failure at an intersection of the tube and an opening in a header tank configured to receive an end of the tube has surprisingly been discovered.

In one embodiment of the invention, a tube for use in a heat exchanger comprises an upper portion, a base portion spaced from the upper portion, and a wall depending from the upper portion. The wall is spaced from the base portion in a first section of the tube and the wall contacts the base portion in a second section of the tube to form a partition.

In another embodiment of the invention, a heat exchanger comprises a first header tank including a first opening providing fluid communication with an interior of the first header tank and a tube including an upper portion, a base portion spaced from the upper portion, and a wall depending from the upper portion. The wall is spaced from the base portion in a first section of the tube and the wall contacts the base portion in a second section of the tube to form a partition. A first portion of the first section of the tube extends into the interior of the first header tank through the first opening.

In another embodiment of the invention, a method of forming a heat exchanger is disclosed. The method comprises the steps of bending opposing end regions of a sheet of material toward each other to form a tube having an upper portion spaced from a base portion, the opposing end regions of the sheet cooperating to form a partitioning wall extending from the upper portion to the base portion and dividing the tube into a pair of flow channels; bending the partitioning wall away from the base portion along a first section of the tube to form a first single flow channel along the first section; and inserting a first portion of the first section of the tube into an interior of a first header tank through a first opening formed therein.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
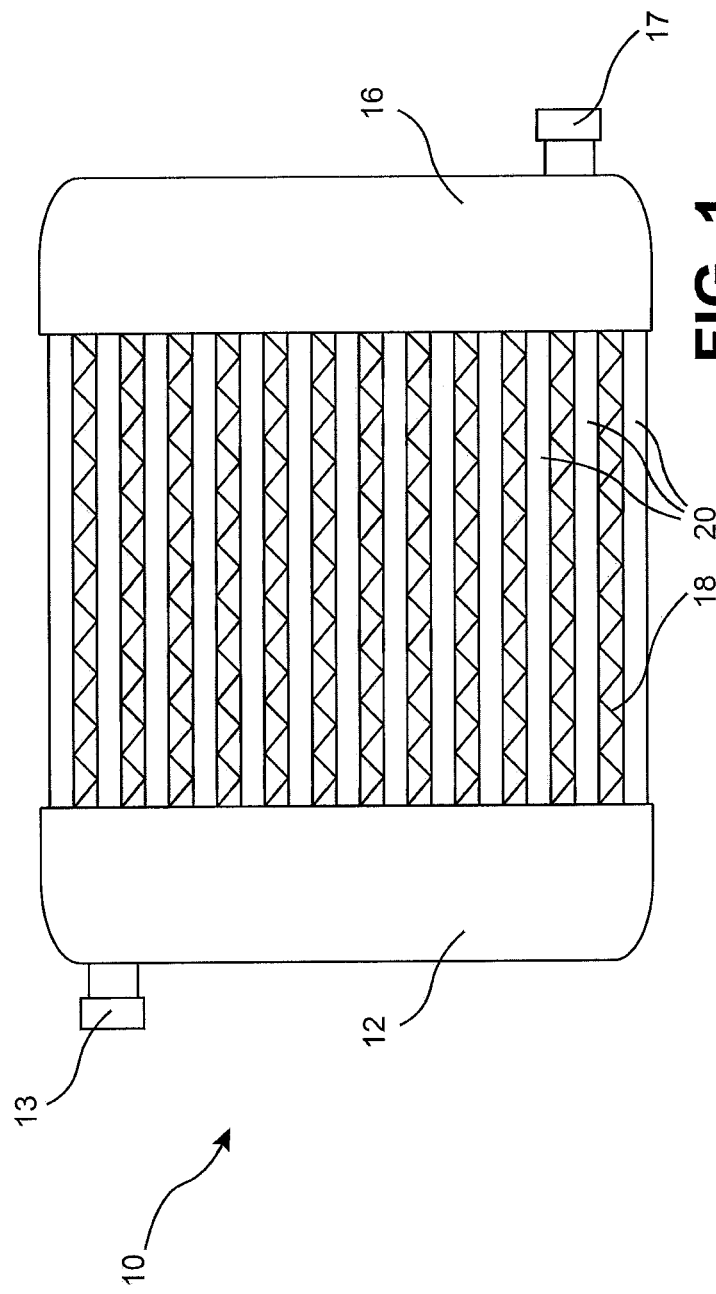
FIG. 1 is an elevational view of a heat exchanger for a motor vehicle according to an embodiment of the invention.

FIG. 1 illustrates a heat exchanger 10 according to an embodiment of the invention. The heat exchanger 10 may be used in an automotive application such as forming a portion of a heating, ventilating, and air conditioning (HVAC) system or a portion of a cooling system for regulating a temperature of one or more components of the automobile, as desired. The heat exchanger 10 may form an evaporator, a condenser, or a radiator of the motor vehicle, as non-limiting examples. The heat exchanger 10 may alternatively be used for any application requiring the exchange of heat energy between two or more fluids, as desired.

The heat exchanger 10 generally comprises a first header tank 12, a second header tank 16, and a plurality of heat exchanger tubes 20 extending longitudinally between the first header tank 12 and the second header tank 16. The first header tank 12 includes at least one first fluid opening 13 for conveying a first fluid to or from the first header tank 12 and the second header tank 16 includes at least one second fluid opening 17 for conveying the first fluid to or from the second header tank 16. The first fluid may be a coolant associated with a cooling system of the motor vehicle or a refrigerant associated with the HVAC system of the motor vehicle. In the embodiment illustrated in FIG. 1, the first fluid is configured to flow in order through the first header tank 12, the plurality of the tubes 20, and the second header tank 16, wherein the first fluid opening 13 forms an inlet port of the first header tank 12 and the second fluid opening 17 forms an outlet port of the second header tank 16. However, it is understood that the heat exchanger 10 may be passable in a reverse flow direction, wherein the first fluid flows in order through the second heat exchanger 16, the plurality of the tubes 20, and the first heat exchanger 12 without altering the scope of the present invention.

A plurality of serpentine or convoluted fins 18 may be disposed in spaces formed between adjacent ones of the tubes 20. The spaces formed between the adjacent ones of the tubes 20 are configured to receive a second fluid such as air, for exchanging heat energy between the second fluid and the first fluid conveyed within the plurality of the tubes 20. The fins 18 are configured to increase a surface area of the heat exchanger 10 exposed to the flow of the second fluid to increase an efficiency of heat transfer between the first and second fluids.

Each of the tubes 20 has a cross-sectional shape including a base portion 22, a first side portion 24 extending from a first end of the base portion 22, a second side portion 26 arranged opposite the first side portion 24 and extending from a second end of the base portion 22, a first upper portion 28 extending inwardly from the first side portion 24, a second upper portion 30 extending inwardly from the second side portion 26, a first partitioning portion 32 depending from the first upper portion 28 towards the base portion 22, and a second partitioning portion 36 depending from the second upper portion 30 towards the base portion 22. The base portion 22, the first upper portion 28, and the second upper portion 30 extend primarily laterally or in a width direction of the tube 20 between the first side portion 24 and the oppositely arranged second side portion 26. The first and second side portions 24, 26 may be substantially arcuate in shape having a desired radius of curvature, but other shapes may be used without departing from the scope of the present invention.

Figure 2:
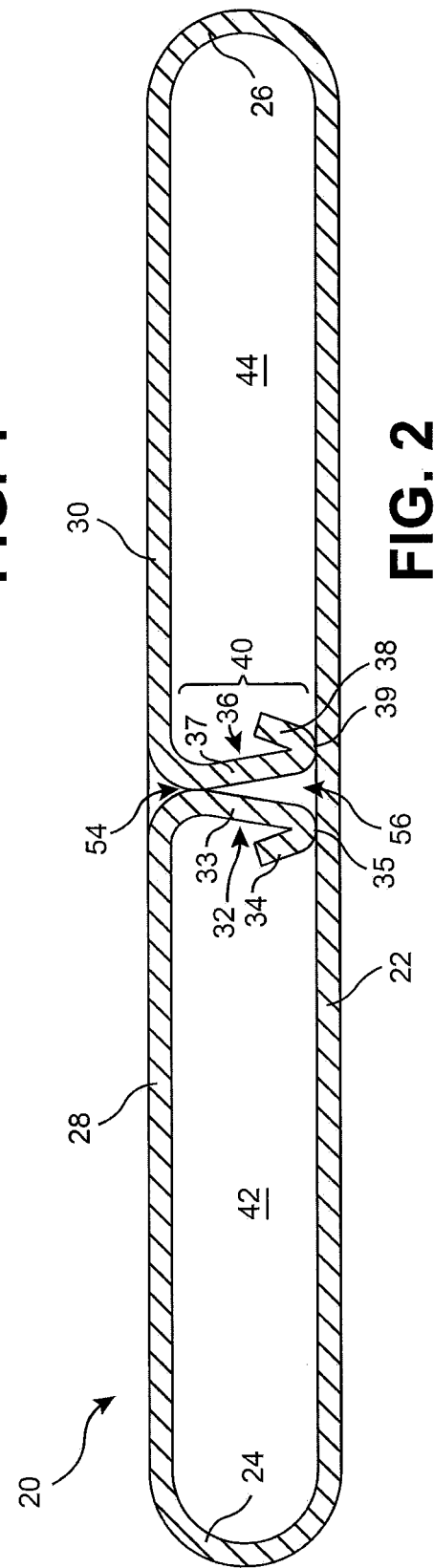
FIG. 2 is a cross-sectional view of a tube for use in the heat exchanger illustrated in FIG. 1 prior to a bending of a partitioning wall thereof.

The first partitioning portion 32 includes a first leg 33, a second leg 34, and a bend portion 35 connecting the first leg 33 to the second leg 34. The first leg 33 extends at least partially in a height direction of the tube 20 perpendicular to the width direction thereof. The first leg 33 may be disposed at an angle relative to the height direction of the tube 20 as shown in FIG. 2 or the first leg 33 may be arranged substantially parallel to the height direction of the tube 20, as desired. The bend portion 35 of the first partitioning portion 32 forms a distal surface configured to engage the base portion 22 of the tube 20. The second leg 34 may be arranged at an angle with respect to the first leg 33 as shown in FIG. 2 or the second leg 34 may be arranged substantially parallel to the first leg 33 while extending in an opposite direction, as desired. In some embodiments, the second leg 34 may be configured to extend parallel to the base portion 22 wherein both the bend portion 35 and the second leg 34 are in contact with the base portion 22. Alternative shapes of the first partitioning portion 32 may be used without departing from the scope of the present invention.

The second partitioning portion 36 includes a first leg 37, a second leg 38, and a bend portion 39 connecting the first leg 37 to the second leg 38. The first leg 37 extends at least partially in the height direction of the tube 20 arranged perpendicular to the width direction thereof. The first leg 37 may be disposed at an angle relative to the height direction of the tube 20 as shown in FIG. 2 or the first leg 37 may be arranged substantially parallel to the height direction of the tube 20, as desired. The bend portion 39 of the second partitioning portion 36 forms a distal surface configured to engage the base portion 22 of the tube 20. The second leg 38 may be arranged at an angle with respect to the first leg 37 as shown in FIG. 2 or the second leg 38 may be arranged substantially parallel to the first leg 37 while extending in an opposite direction, as desired. In some embodiments, the second leg 38 may be configured to extend parallel to the base portion 22, wherein both the bend portion 39 and a length of the second leg 38 are in contact with the base portion 22. Alternative shapes of the second partitioning portion 36 may be used without departing from the scope of the present invention.

The first partitioning portion 32 and the second partitioning portion 36 cooperate to form a partitioning wall 40 dividing a hollow interior of the tube 20 into a first flow channel 42 formed to a first side of the partitioning wall 40 and a second flow channel 44 formed to a second side of the partitioning wall 40. The first flow channel 42 and the second flow channel 44 may be shaped and dimensioned to be symmetric about a plane generally defined by the partitioning wall 40, as desired.

Figure 3:
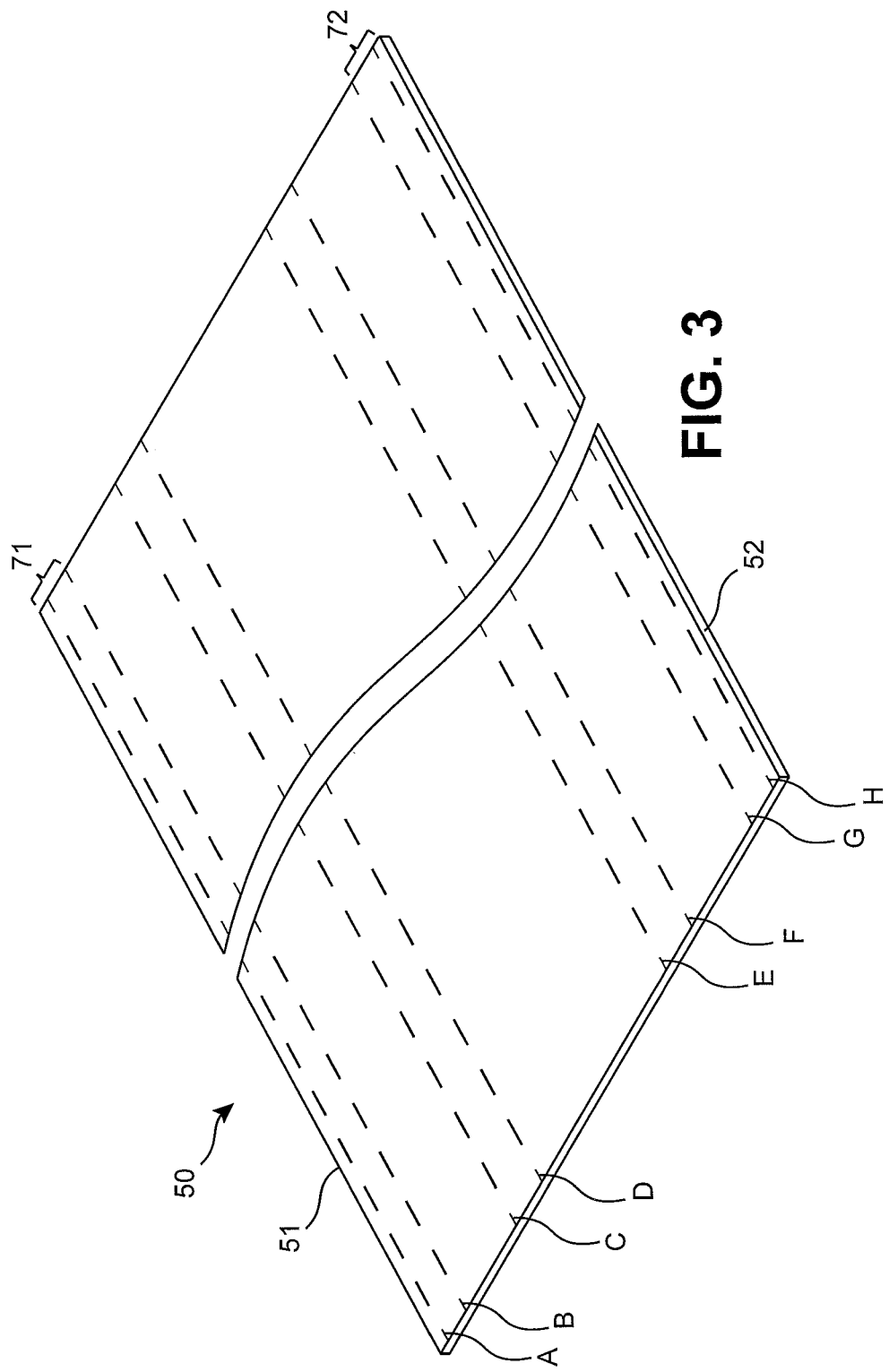
FIG. 3 is a perspective view of a sheet of material for forming the cross-sectional shape of the tube illustrated in FIG. 2.

The tube 20 is formed by first bending a sheet of a material such as aluminium into the tubular cross-sectional shape illustrated in FIG. 2 for delimiting a flow of the first fluid therethrough. For example, with reference to FIG. 3, a sheet 50 of material is marked with longitudinally extending lines A, B, C, D, E, F, G, and H indicating divisions of the sheet 50 corresponding to the features identified in FIG. 2. The first leg 33 of the first partitioning portion 32 is formed in the sheet 50 intermediate the line A and a first side edge 51 of the sheet 50, the second leg 34 of the first partitioning portion 32 is formed intermediate the lines A and B, the first upper portion 28 is formed intermediate the lines B and C, the first side portion 24 is formed intermediate the lines C and D, the base portion 22 is formed intermediate the lines D and E, the second side portion 26 is formed intermediate the lines E and F, the second upper portion 30 is formed intermediate the lines F and G, the first leg 37 of the second partitioning portion 36 is formed intermediate the lines G and H, and the second leg 38 of the second partitioning portion 36 is formed intermediate the line H and a second side edge 52 of the sheet 50.

The bending of the tube 20 into the cross-sectional shape shown in FIG. 2 may occur according to the following steps. The sheet 50 may be folded about the line A to cause the second leg 34 of the first partitioning portion 32 to be disposed at an angle relative to the first leg 33 thereof while also folding the sheet 50 about the line H to cause the second leg 38 of the second partitioning portion 36 to be disposed at an angle relative to the first leg 37 thereof. Next, the sheet 50 is folded about the lines B and G to complete formation of each of the first partitioning portion 32 and the second partitioning portion 36, respectively. The folding of the sheet 50 about the line B causes the first partitioning portion 32 to be angled relative to the portion of the sheet 50 defining the first upper portion 28 while the folding of the sheet 50 about the line G causes the second partitioning portion 36 to be angled relative to the portion of the sheet 50 defining the second upper portion 30.

The sheet 50 is then bent into a substantially arcuate shape between each of the lines C and D and the lines E and F to cause formation of the first side portion 24 and the second side portion 26, respectively. The formation of the side portions 24, 26 causes the first partitioning portion 32 to be brought towards the second partitioning portion 36 while also causing the first and second upper portions 28, 30 to be arranged substantially parallel to the base portion 22. One skilled in the art should appreciate that the sheet 50 may be bent in an alternative order while still arriving at the same cross-sectional shape illustrated in FIG. 2, including folding the first legs 33, 37 relative to the second legs 34, 38 following the bending of the remainder of the tube 20, as one non-limiting example.

Following the initial bending of the tube 20 described hereinabove, the first leg 33 of the first partitioning portion 32 abuts the first leg 37 of the second partitioning portion 36 to form a seam 54 extending along a length of the tube 20 in a direction perpendicular to each of the height direction and the width direction thereof. Additionally, the bend portion 35 of the first partitioning portion 32 is in contact with the base portion 22 of the tube 20 at a position spaced apart in the width direction of the tube 20 from a position the bend portion 39 of the second partitioning portion 36 contacts the base portion 22 of the tube 20 to form a fillet 56 therebetween. A size of the fillet 56 is based on the angle formed between the first legs 33, 37 of the first and second partitioning portions 32, 36 as well as a height of the tube 20 formed between the base portion 22 and the first and second upper portions 28, 30.

The tube 20 is generally described as including the base portion 22 arranged parallel to the first and second upper portions 28, 30 intermediate the first and second side portions 24, 26, but it should be understood that those portions of the tube 20 formed to either lateral side of the partitioning wall 40 may have alternative shapes without affecting a use of the tube 20. The tube 20 may for example have flared lateral regions as is disclosed in pending U.S. Patent Application Publication No. 2014/0196877 to Wilkins et al., which is hereby incorporated herein by reference in its entirety.

The initial process of bending the tube 20 may therefore be summarized as including the bending of a first end region 71 of the sheet 50, which extends between the first side edge 51 and the line B and corresponds to the first partitioning portion 32 of the tube 20, towards a second end region 72 of the sheet 50, which extends between the second side edge 52 and the line G and corresponds to the second partitioning portion 36 of the tube 20, to form a closed tubular structure for delimiting a flow of the first fluid therethrough. The first end region 71 is additionally brought into abutment with the second end region 72 in a manner wherein each of the end regions 71, 72 spans the height dimension of the tube 20 extending between the base portion 22 and the first and second upper portions 28, 30, thereby forming the partitioning wall 40 for delimiting the flow of the first fluid into each of the first flow channel 42 formed to the first side of the partitioning wall 40 and the second flow channel 44 formed to the second side of the partitioning wall 40.

Figure 4:
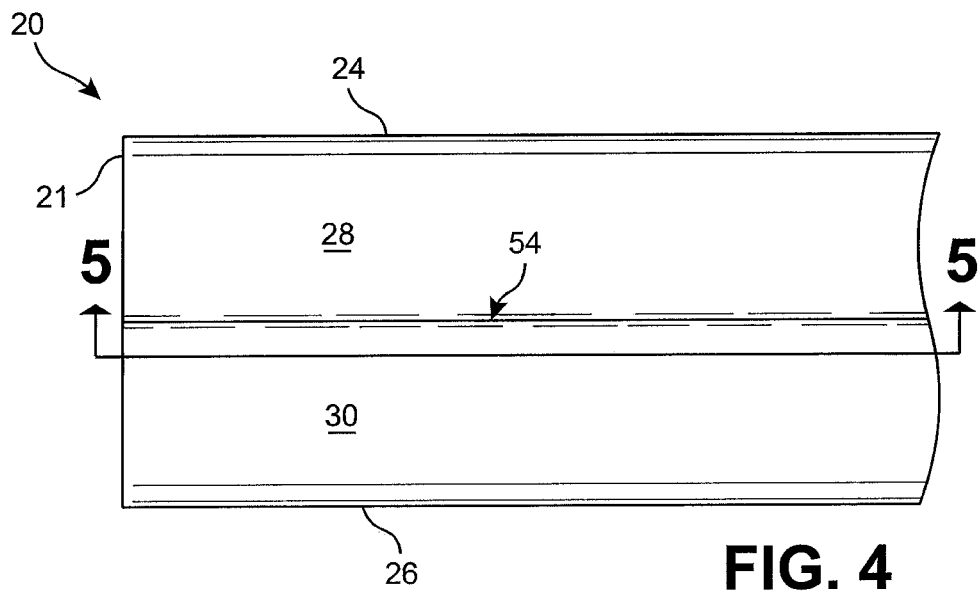
FIG. 4 is a fragmentary top plan view of the tube of FIG. 2.
Figure 5:
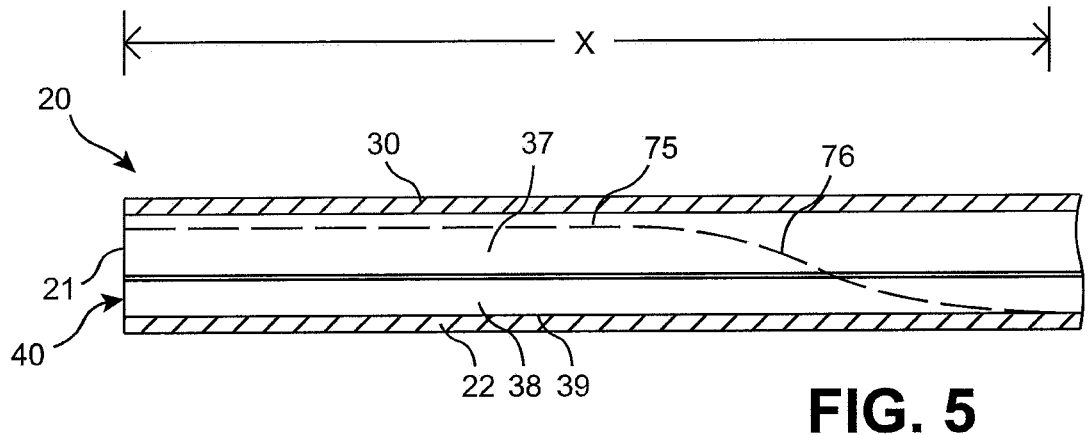
FIG. 5 is a cross-sectional elevational view of an interior of the tube of FIG. 2 taken through section lines 5-5 of FIG. 4 prior to a bending of a partitioning wall of the tube.
Figure 6:
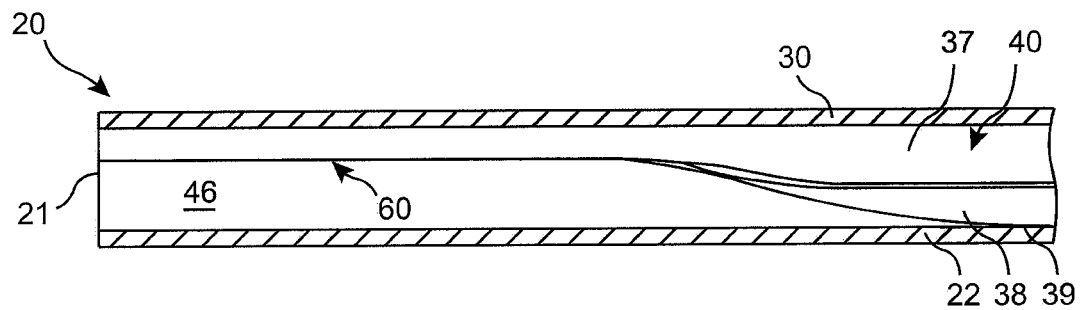
FIG. 6 is a cross-sectional elevational view of the interior of the tube of FIG. 2 as taken through section lines 5-5 of FIG. 4 following the bending of the partitioning wall of the tube.
Figure 7:
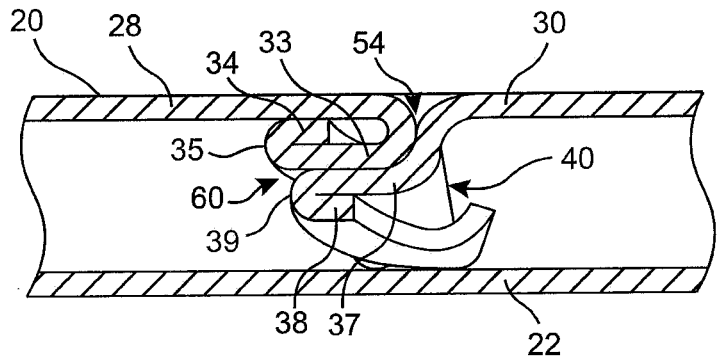
FIG. 7 is a fragmentary cross-sectional view of an interior of the tube of FIG. 2 following the bending of the partitioning wall of the tube.

After formation of the tube 20 into the shape shown in FIG. 2, a secondary bending process is carried out with respect to the partitioning wall 40 of the tube 20, as best shown in FIG. 5-7. FIG. 5 illustrates a side elevational view of an interior of a first end 21 of the tube 20 (with reference to section lines 5-5 as shown in FIG. 4) following the formation of the sheet 50 into the tubular structure illustrated in FIG. 2. A fold line 75 represented by a dashed line extends along the various surfaces forming the partitioning wall 40 and corresponds to a line across which a portion of the partitioning wall 40 formed adjacent the first end 21 of the tube 20 is folded or bent in a common direction to one side of the initial position of the partitioning wall 40. The portion of the partitioning wall 40 bent or folded away from the base portion 22 of the tube 20 is hereinafter referred to as the folded portion 60 of the partitioning wall 40.

The fold line 75 may begin at the first end 21 of the tube 20 adjacent the seam 54 and extend longitudinally a distance X towards the second end of the tube 20 until the fold line 75 intersects a lowermost extension of the partitioning wall 40 formed by the bend portions 35, 39 of the first and second partitioning portions 32, 36, thereby indicating a longitudinal end of the folded portion 60 of the partitioning wall 40. The fold line 75 is shown as including at least one inclined portion 76. The inclined portion 76 of the fold line 75 is inclined with respect to a plane generally defined by the base portion 22 of the tube 20. The inclined portion 76 of the fold line 75 may be rectilinear or curvilinear and may have a concave or convex shape, as desired. It is understood that different forms and configurations of the fold line 75 may be used without departing from the scope of the present invention, so long as the partitioning wall 40 is separated from the base portion 22 of the tube 20 along a desired length of the tube 20, as explained in greater detail hereinafter.

In the embodiment illustrated in FIGS. 6 and 7, the partitioning wall 40 is folded or bent away from the base portion 22 of the tube 20 in a direction towards each of the first side portion 24 and the first upper portion 28 until the partitioning wall 40 is arranged to extend at least partially in the width direction of the tube 20 while spaced apart from the base portion 22 of the tube 20. The bending or folding of the partitioning wall 40 may include deforming the partitioning wall 40 about an axis formed adjacent the seam 54 by pivoting a remainder of the partitioning wall 40 about the axis until a distal end of the partitioning wall 40 no longer contacts the base portion 22 of the tube 20. The process of bending or folding the partitioning wall 40 may include the use of any tool suitable for grasping a desired length of the partitioning wall 40 and then translating or pivoting the grasped portion of the partitioning wall 40 to space the partitioning wall 40 from the base portion 22 of the tube 20. The bending or folding of the partitioning wall 40 results in the tube 20 having a single flow channel 46 at the first end 21 of the tube 20 along the portions of the tube 20 corresponding to the folded portion 60 of the partitioning wall 40.

FIG. 7 illustrates an interior of the tube 20 immediately following the folding or bending of the folded portion 60 of the partitioning wall 40. The entirety of the partitioning wall 40 depending downwardly from the seam 54 is bent about the axis disposed adjacent the seam 54 until the second leg 34 of the first partitioning portion 32 abuts the first upper portion 28 of the tube 20. The first partitioning portion 32 retains the bend portion 35 present between the first and second legs 33, 34 thereof and the second partitioning portion 36 retains the inclusion of the bend portion 39 present between the first and second legs 37, 38. Thus, the folded portion 60 of the partitioning wall 40 maintains substantially the same cross-sectional shape following the folding or bending thereof toward the first upper portion 28. The folded portion 60 of the partitioning wall 40 may be further compressed together and towards the first upper portion 28 of the tube 20 to cause all of the legs 33, 34, 37, 38 of the first and second partitioning portions 32, 36 to be arranged in parallel to reduce a profile of the folded portion 60 of the partitioning wall 40. The reduction in height of the profile of the folded portion 60 of the partitioning wall 40 increases a height of the single flow channel 46 as it spans the folded portion 60 of the partitioning wall 40.

Figure 8:
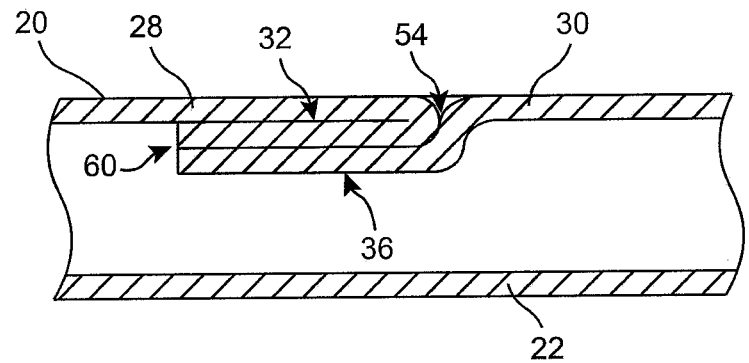
FIG. 8 is a fragmentary cross-sectional view of an interior of the tube of FIG. 2 following the bending of the partitioning wall according to another embodiment of the invention.
Figure 9:
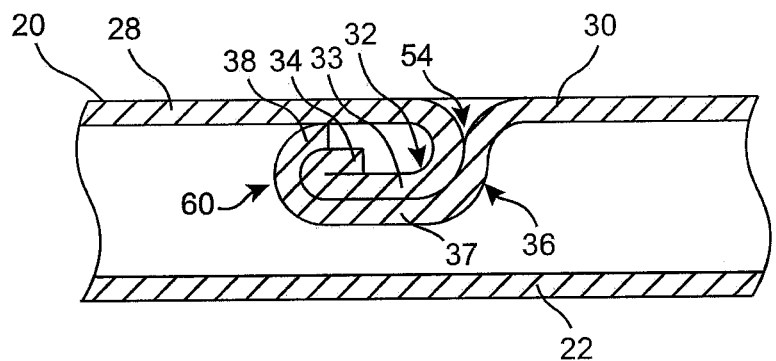
FIG. 9 is a fragmentary cross-sectional view of an interior of the tube of FIG. 2 following the bending of the partitioning wall according to another embodiment of the invention.

The folded portion 60 of the partitioning wall 40 may have alternative cross-sectional configurations without departing from the scope of the present invention. For example, FIGS. 8 and 9 show alternative cross-sectional shapes of the folded portion 60 of the partitioning wall 40 following a bending or folding of the partitioning wall 40 away from the base portion 22 of the tube 20. In FIG. 8, the entirety of the first and second partitioning portions 32, 36 are bent to extend parallel to each other as well as each of the base portion 22 and the first upper portion 28 of the tube 20. The bending or folding of the folded portion 60 of the partitioning wall 40 therefore includes the removal of the bend portion 35 formed between the first and second legs 33, 34 of the first partitioning portion 32 as well as the removal of the bend portion 39 formed between the first and second legs 37, 38 of the second partitioning portion 36. The removal of the bend portions 35, 39 results in the single common flow channel 46 formed at the first end 21 of the tube 20 along the folded portion 60 of the partitioning wall 40 having a maximized spacing between the base portion 22 and the folded portion 60 of the partitioning wall 40. FIG. 9 illustrates a cross-sectional shape wherein the second legs 34, 38 of the first and second partitioning portions 32, 36 are folded about an end of the partitioning wall 40 to extend at least partially between the first legs 33, 37 of the first and second partitioning portions 32, 36 and the first upper portion 28 of the tube 20. It should be understood that the folded portion 60 of the partitioning wall 40 may be folded to any side thereof and may have any cross-sectional shape so long as the partitioning wall 40 does not contact the base portion 22 along a selected portion of the tube 20 in a manner dividing the tube 20 into the first and second flow channels 42, 44.

Following the folding or bending of folded portion 60 of the partitioning wall 40, no division exists between the first and second flow channels 42, 44 along the folded portion 60 and no reinforcing support exists between the base portion 22 and the first and second upper portions 28, 30 of the tube 20. However, the first and second partitioning portions 32, 36 of the tube 20 remain in contact adjacent the first and second upper portions 28, 30 of the tube 20 to allow for the seam 54 to continue towards the first end 21 of the tube 20, despite the partitioning wall 40 not contacting the base portion 22 of the tube 20 along the folded portion 60 thereof.

The tube 20 may include a second folded portion 60 of the partitioning wall 40 formed at the second end 22 of the tube 20 formed opposite the first end 21 thereof. The folded portion 60 of the partitioning wall 40 formed at the second end 22 of the tube 20 may be formed in the same manner as the folded portion 60 of the partitioning wall 40 formed at the first end 21 thereof. The folded portion 60 of the partitioning wall 40 at the second end 22 of the tube 20 may have substantially the same length and cross-sectional configuration as the folded portion 60 of the partitioning wall 40 at the first end 21 of the tube 20, as desired. The folded portion 60 of the partitioning wall 40 at the second end 22 of the tube 20 may for example extend the length X from the second end 22 of the tube 20, as desired.

Figure 10:
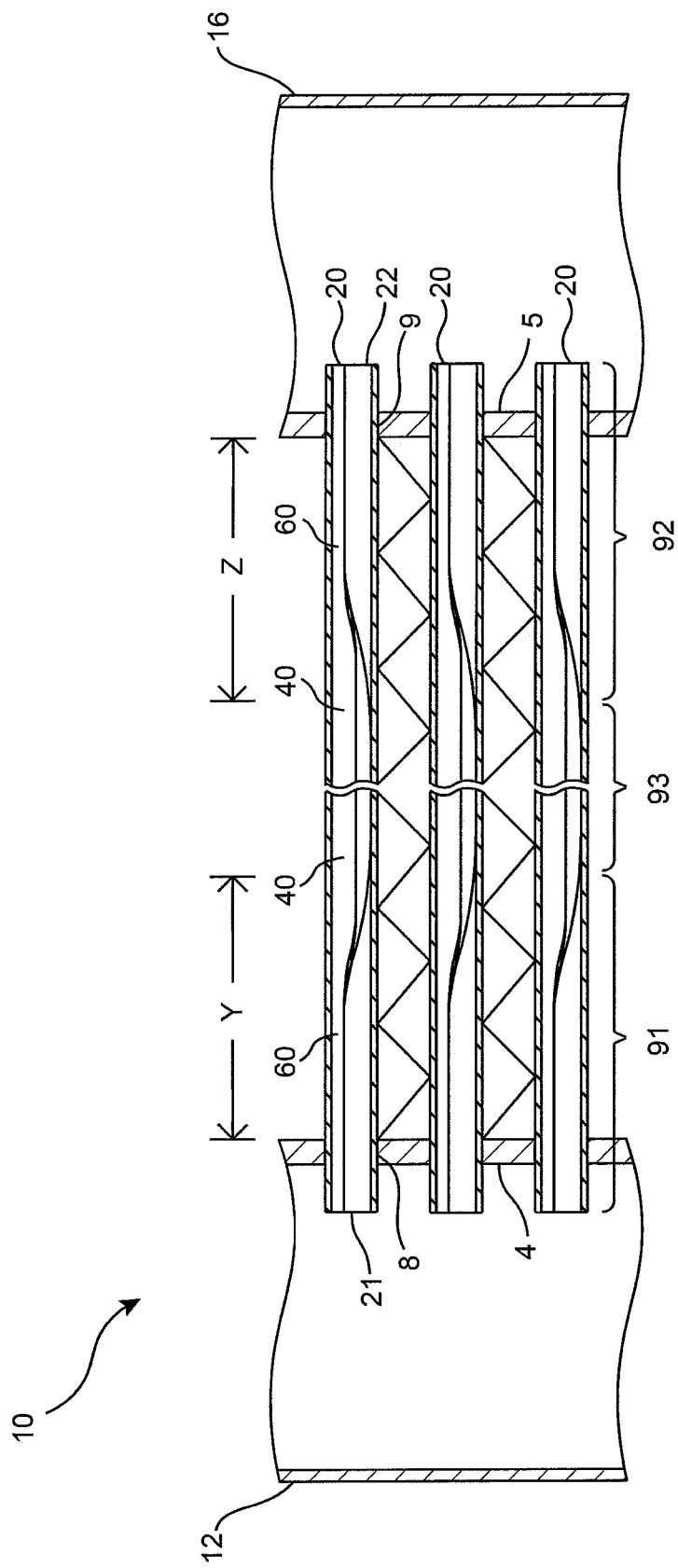
FIG. 10 is a fragmentary cross-sectional view of a heat exchanger having the tubes illustrated in FIG. 6.

Referring now to FIG. 10, the inclusion of the folded portions 60 of the partitioning wall 40 at the opposing ends 21, 22 of the tube 20 divides the tube 20 into three different sections. A first end section 91 includes the folded portion 60 of the partitioning wall 40 at the first end 21 of the tube 20, a second end section 92 includes the folded portion 60 of the partitioning wall 40 at the second end 22 of the tube 20, and a central section 93 formed intermediate the first and second end sections 91, 92 includes the partitioning wall 40 contacting the base portion 22 of the tube 20 to divide the tube 20 into the first and second flow channels 42, 44. The first end section 91 and the second end section 92 may each be formed to have the common length X as measured from each respective end 21, 22 of the tube 20, as desired.

The first end section 91 of the tube 20 is received into a first opening 8 formed in an inner wall 4 of the first header tank 12 to position the first end 21 of the tube 20 within an interior of the first header tank 12. Similarly, the second end section 92 of the tube 20 is received into a second opening 9 formed in an inner wall 5 of the second header tank 16 to position the second end 22 of the tube 20 within an interior of the second header tank 16. The openings 8, 9 may have cross-sectional shapes substantially corresponding to the cross-sectional shape of the exterior of the tube 20 along the first and second end sections 91, 92 thereof. The inner wall 4 of the first header tank 12 may be formed integrally with a remainder of the first header tank 12 or may be a separate component such as a header plate coupled to the remainder of the first header tank 12. Similarly, the inner wall 5 of the second header tank 16 may be formed integrally with the remainder of the second header tank 16 or may be a separate component such as a header plate coupled to the remained of the second header tank 16.

A first portion of the first end section 91 of the tube 20 extends a preselected distance into the interior of the first header tank 12 beyond the first inner wall 4 thereof while a second portion of the first end section 91 extends outwardly from the interior of the first header tank 12 by a preselected distance Y. The distance Y may preferably be selected to be in the range of 5-10 mm, but any distance for the distance Y may be selected without departing from the scope of the present invention. The positioning of the tube 20 relative to the first header tank 12 results in the first end section 91 of the tube 20 spanning the first inner wall 4 to extend at least partially beyond the first inner wall 4 in each of two opposing directions. Similarly, a first portion of the second end section 92 of the tube 20 extends a preselected distance into the interior of the second header tank 16 beyond the second inner wall 5 thereof while a second portion of the second end section 92 extends outwardly from the interior of the second header tank 16 by a preselected distance Z. The distance Z may be substantially equal to the distance Y or may differ from the distance Y, as desired. The distance Z may preferably be selected to be in the range of 5-10 mm, as desired. The positioning of the tube 20 relative to the second header tank 16 results in the second end section 92 of the tube 20 spanning the second inner wall 5 to extend at least partially beyond the second inner wall 5 in each of two opposing directions. The central section 93 of the tube 20 having the partitioning wall 40 in contact with the base portion 22 of the tube 20 is disposed intermediate and spaced apart from each of the first header tank 12 and the second header tank 16. The central section 93 is shown in fragmentary form in FIG. 10, but it should be understood that the central section 93 may be longer than either of the first or second end sections 91, 92 and may have any desired length, as desired.

At least one surface of each of the sheets 50 used to form the tubes 20 is coated with a braze material which is commercially available and well known to those skilled in the art. The brazing material may for example be placed on a surface of the sheet 50 corresponding to an outermost surface of the tube 20 following the bending thereof. Once the tube 20 has been received into the first and second header tanks 12, 16, the entirety of the heat exchanger 10 may be heated at a predetermined temperature to melt the brazing material disposed on the sheet 50 forming the tube 20, the brazing flux causing the braze material to flow by capillary flow from the position of the seam 54 and into the braze receiving fillet area 56. The portion of the seam 54 extending along the first and second end sections 91, 92 of the tube 20 is also filled by the brazing material adjacent the first and second ends 21, 22 of the tube 20 thereof to maintain the integrity of the connection between the tube 20 and each of the header tanks 12, 16 at the seam 54 despite the folding over of the folded portion 60 of the partitioning wall 40. The tube 20 is then cooled to solidify the molten braze material in the fillet area 56 to secure the partitioning wall 40 to the base portion 22 along the central section 93 of the tube 20. The heating and cooling of the braze material concurrently couples each of the tubes 20 to the first and second header tanks 12, 16 due to the inclusion of the braze material between the outermost surface of the tube 20 and each of the openings 8, 9 formed in the respective header tanks 12, 16.

It has surprisingly been discovered that the introduction of the folded portion 60 of the partitioning wall 40 resulting in the absence of a reinforcing partitioning wall 40 extending between the first and second upper portions 28, 30 and the base portion 22 of each of the tubes 20 at the intersection of the header tanks 12, 16 and each of the tubes 20 beneficially results in reduced failure due to thermal cycling of the heat exchanger 10. More specifically, the removal of an intersection of each of the base portion 22 of the tube 20, the partitioning wall 40, and a portion of one of the header tanks 12, 16 removes a potential form of failure caused by varying degrees of thermal expansion between each of the individual components. The positioning of the central portion 93 having the partitioning wall 40 contacting the base portion 22 spaced from each of the header tanks 12, 16 aids in forming a single flow channel 46 adjacent the ends 21, 22 of the tube 20 to more uniformly distribute the thermal energy at the ends 21, 22 of the tube 20 in comparison to a tube having two distinct and separated flow channels adjacent each of the header tanks. Additionally, the removal of an additional reinforcing structure adjacent each of the header tanks 12, 16 further eliminates a source of stress risers within the ends 21, 22 of the tube 20 that could potentially lead to sudden failure of the tube 20 during thermal cyclying.

The introduction of the folded portion 60 of the partitioning wall 40 aids in preventing failure at the header tanks 12, 16 while also beneficially maintaining the seam 54 present between the first and second partitioning portions 32, 36 to allow for a manufacturing process such as brazing to be applied to the length of the tube 20 to ensure that separation of the tube 20 does not occur along any of the first end section 91, the second end section 92, or the central section 93. The folded portion 60 also beneficially allows for two or more flow channels to be formed in the central section 93 of the tube 20 without introducing the potential form of failure at the junction with the header tanks 12, 16, thereby improving an efficiency of the heat exchanger 10 having the tubes 20.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A method of forming a heat exchanger, the method comprising the steps of:
    bending opposing end regions of a sheet of material toward each other to form a tube having an upper portion spaced from a base portion, the opposing end regions of the sheet cooperating to form a partitioning wall extending from the upper portion to the base portion to divide the tube into a pair of flow channels;

bending the partitioning wall away from the base portion along a first section of the tube to form a first single flow channel along the first section; and inserting a first portion of the first section of the tube through a first opening formed in a first header tank to provide fluid communication between the first single flow channel of the tube and an interior of the first header tank.

2. The method according to claim 1, further comprising steps of: coating at least a portion of the tube and at least a portion of the first header tank with a brazing material; and heating the brazing material following the step of inserting the first portion of the first section of the tube into the interior of the first header tank through the first opening.

3. The method according to claim 1, wherein a seam extends along a length of the tube, the seam formed at an intersection of the opposing end regions of the tube.

4. The method according to claim 1, wherein the partitioning wall is arranged substantially parallel to the upper portion in the first section of the tube.

5. The method according to claim 1, wherein in a portion of the tube adjacent the first section which includes the pair of flow channels, the opposing end regions of the sheet of material each contact the base portion.

6. The method according to claim 1, wherein the opposing end regions are each spaced from the base portion in the first section of the tube.

7. The method according to claim 1, wherein the opposing end regions overlap in a height direction of the tube in the first section of the tube.

8. The method according to claim 1, wherein in a portion of the tube adjacent the first section which includes the pair of flow channels, the opposing end regions of the sheet of material each contact the base portion, wherein the opposing end regions are each spaced from the base portion in the first section of the tube, and wherein the opposing end regions overlap in a height direction of the tube in the first section of the tube.

9. The method according to claim 1, wherein a second portion of the first section is disposed outside of the first header tank.

10. The method according to claim 9, wherein the second portion of the first section has a length in a range of between 5 and 10 mm.

11. The method according to claim 1, further comprising steps of: bending the partitioning wall away from the base portion along a second section of the tube to form a second single flow channel along the second section; and inserting a first portion of the second section through a second opening formed in a second header tank to provide fluid communication between the second single flow channel of the tube and an interior of the second header tank.

12. The method according to claim 11, wherein the first section is formed at a first end of the tube and the second section is formed at a second end of the tube.

13. The method according to claim 11, wherein a third section of the tube between the first section and the second section includes the pair of flow channels, and wherein the opposing end regions of the sheet of material each contact the base portion in the third section of the tube.

14. The method according to claim 11, wherein the opposing end regions are each spaced from the base portion in the first section and the second section of the tube.

15. The method according to claim 11, wherein the opposing end regions overlap in a height direction of the tube in the first section and the second section of the tube.

16. The method according to claim 11, wherein a third section of the tube between the first section and the second section includes the pair of flow channels, and wherein the opposing end regions of the sheet of material each contact the base portion in the third section of the tube, wherein the opposing end regions are each spaced from the base portion in the first section and the second section of the tube, and wherein the opposing end regions overlap in a height direction of the tube.

17. A method of forming a heat exchanger, the method comprising the steps of:

bending opposing end regions of a sheet of material toward each other to form a tube having an upper portion spaced from a base portion, the opposing end regions of the sheet cooperating to form a partitioning wall extending from the upper portion to the base portion to divide the tube into a pair of flow channels;

bending the partitioning wall away from the base portion along an entirety of a first section of the tube to form a first single flow channel along the first section;

inserting a first portion of the first section of the tube through a first opening formed in a first header tank to provide fluid communication between the first single flow channel of the tube and an interior of the first header tank;

bending the partitioning wall away from the base portion along an entirety of a second section of the tube to form a second single flow channel along the second section; and inserting a first portion of the second section through a second opening formed in a second header tank to provide fluid communication between the second single flow channel of the tube and an interior of the second header tank;

wherein a third section of the tube is directly connected to the first section and the second section; and wherein the partitioning wall contacts the base portion along an entirety of the third section of the tube.

18. The method according to claim 17, wherein the third section of the tube between the first section and the second section includes the pair of flow channels, and wherein the opposing end regions of the sheet of material each contact the base portion in the third section of the tube.

19. The method according to claim 17, wherein the opposing end regions are each spaced from the base portion in the first section and the second section of the tube, and wherein the opposing end regions overlap in a height direction of the tube in the first section and the second section of the tube.

* * * * *